(12) United States Patent
Neubauer

(10) Patent No.: US 11,872,954 B2
(45) Date of Patent: Jan. 16, 2024

(54) METHOD FOR DEACTIVATING A MOTOR VEHICLE, DEACTIVATION SYSTEM FOR A MOTOR VEHICLE, AND MOTOR VEHICLE

(71) Applicant: Volkswagen Aktiengesellschaft, Wolfsburg (DE)

(72) Inventor: Marc Neubauer, Vechelde GT Siersse (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 423 days.

(21) Appl. No.: 17/416,003

(22) PCT Filed: Dec. 13, 2019

(86) PCT No.: PCT/EP2019/085029
§ 371 (c)(1),
(2) Date: Sep. 22, 2021

(87) PCT Pub. No.: WO2020/126880
PCT Pub. Date: Jun. 25, 2020

(65) Prior Publication Data
US 2022/0063556 A1    Mar. 3, 2022

(30) Foreign Application Priority Data
Dec. 21, 2018  (DE) .................... 10 2018 222 864.7

(51) Int. Cl.
*B60R 25/04* (2013.01)
*G06F 8/65* (2018.01)
*G06F 12/14* (2006.01)

(52) U.S. Cl.
CPC ................ *B60R 25/04* (2013.01); *G06F 8/65* (2013.01); *G06F 12/1408* (2013.01); *G06F 2212/1052* (2013.01)

(58) Field of Classification Search
CPC ....... B60R 25/04; G06F 8/65; G06F 12/1408; G06F 2212/1052; G06F 21/88; H04L 9/0861; H04L 2209/80; H04L 2209/84
(Continued)

(56) References Cited

U.S. PATENT DOCUMENTS 4,990,890 A * 2/1991 Newby ................ B60R 25/102
340/904
5,619,573 A * 4/1997 Brinkmeyer .......... H04L 9/3271
340/5.27
(Continued)

FOREIGN PATENT DOCUMENTS

DE      4333474 A1    2/1995    ............. B60R 25/00
DE     19936116 A1    2/2001    ............. B60R 25/04
(Continued)

OTHER PUBLICATIONS

German Office Action, Application No. 102018222864.7, 7 pages, dated Jun. 25, 2019.
(Continued)

*Primary Examiner* — Jaime Figueroa
(74) *Attorney, Agent, or Firm* — Slayden Grubert Beard PLLC

(57) ABSTRACT

The invention relates to a method for deactivating a motor vehicle, wherein the motor vehicle comprises a deactivation system having a plurality of bus subscribers each having a deactivation function, said method comprising: selecting, on the basis of a random number, a set of bus subscribers from a plurality of bus subscribers having the deactivation function in order to provide the deactivation of the motor vehicle.

15 Claims, 2 Drawing Sheets

(58) Field of Classification Search
USPC .......................................................... 701/99
See application file for complete search history.

(56) References Cited

U.S. PATENT DOCUMENTS

| | | | | |
|---|---|---|---|---|
| 5,675,490 | A * | 10/1997 | Bachhuber | B60R 25/04 |
| | | | | 340/5.31 |
| 5,708,712 | A * | 1/1998 | Brinkmeyer | B60R 25/04 |
| | | | | 713/181 |
| 5,729,192 | A * | 3/1998 | Badger | B60R 25/04 |
| | | | | 307/10.6 |
| 6,018,291 | A * | 1/2000 | Marble | B60R 25/04 |
| | | | | 340/5.31 |
| 6,091,340 | A * | 7/2000 | Lee | B60R 25/04 |
| | | | | 340/5.6 |
| 6,664,888 | B1 * | 12/2003 | Bishop | B60R 25/04 |
| | | | | 340/425.5 |
| 6,700,476 | B1 * | 3/2004 | Okada | G07C 9/00309 |
| | | | | 340/12.51 |
| 7,088,219 | B2 * | 8/2006 | Dawson | B60R 25/04 |
| | | | | 340/5.31 |
| 8,805,599 | B2 | 8/2014 | Hibbert | 701/2 |
| 9,168,893 | B1 * | 10/2015 | Schwartz | B60R 25/04 |
| 9,646,794 | B2 | 5/2017 | Lacy | |
| 9,688,245 | B2 | 6/2017 | Schwartz | |
| 9,965,637 | B2 * | 5/2018 | Baur | H04L 63/06 |
| 9,975,504 | B2 | 5/2018 | Dalke | |
| 10,017,156 | B2 | 7/2018 | Etonye | |
| 10,025,899 | B2 * | 7/2018 | Tarte | B60Q 1/143 |
| 10,081,332 | B2 | 9/2018 | Maihöfer et al. | |
| 10,088,840 | B2 | 10/2018 | Dorval et al. | |
| 10,102,163 | B2 * | 10/2018 | Spiegel | G06F 13/4295 |
| 10,102,382 | B1 * | 10/2018 | Hart | G06F 21/57 |
| RE47,354 | E * | 4/2019 | Flick | B60R 25/102 |
| 10,259,469 | B2 * | 4/2019 | Miloser | G06F 8/65 |
| 10,628,643 | B2 * | 4/2020 | Wilding | G06K 7/0008 |
| 10,657,288 | B2 | 5/2020 | Sellschopp | |
| 11,411,767 | B2 * | 8/2022 | Jerolm | H04L 12/2859 |
| 2001/0040503 | A1 * | 11/2001 | Bishop | B60R 25/04 |
| | | | | 340/425.5 |
| 2004/0124707 | A1 * | 7/2004 | Boggs | B60R 25/04 |
| | | | | 307/10.5 |
| 2004/0160319 | A1 | 8/2004 | Joao | 340/539.1 |
| 2005/0237167 | A1 * | 10/2005 | Hager | B60R 25/045 |
| | | | | 340/13.24 |
| 2009/0018731 | A1 * | 1/2009 | Grenell | B60R 16/03 |
| | | | | 701/99 |
| 2013/0205412 | A1 * | 8/2013 | Ricci | G06F 3/0484 |
| | | | | 726/29 |
| 2014/0297154 | A1 * | 10/2014 | Yamamoto | B60R 25/04 |
| | | | | 701/99 |
| 2015/0006035 | A1 * | 1/2015 | Ricci | B60R 25/01 |
| | | | | 701/99 |
| 2015/0156010 | A1 * | 6/2015 | Brahner | H04L 9/00 |
| | | | | 701/102 |
| 2015/0307042 | A1 * | 10/2015 | Kurtz | B60R 16/03 |
| | | | | 307/10.1 |
| 2016/0292106 | A1 * | 10/2016 | Spiegel | H04L 12/40202 |
| 2016/0330204 | A1 * | 11/2016 | Baur | H04L 63/06 |
| 2017/0355381 | A1 * | 12/2017 | Miloser | G07C 5/008 |
| 2017/0364629 | A1 * | 12/2017 | Tarte | G16Z 99/00 |
| 2018/0357424 | A1 * | 12/2018 | Hart | G06F 21/88 |
| 2019/0095662 | A1 * | 3/2019 | Wilding | G06K 7/10366 |
| 2019/0325432 | A1 * | 10/2019 | Ow | G06Q 20/3678 |
| 2020/0071894 | A1 * | 3/2020 | Coyne | B60R 16/023 |
| 2021/0203682 | A1 * | 7/2021 | Bajpai | G06F 21/55 |

FOREIGN PATENT DOCUMENTS

| | | | | |
|---|---|---|---|---|
| DE | 202011003144 | U1 * | 7/2012 | ............ H04L 12/10 |
| DE | 102013020333 | A1 | 6/2015 | ............ B60R 25/04 |
| DE | 102015010203 | A1 | 2/2017 | ............ B60R 16/02 |
| DE | 102018222864 | B3 | 2/2020 | ............ B60R 25/00 |
| DE | 2020/126880 | A1 | 6/2020 | ............ B60R 25/00 |
| EP | 2493123 | A2 * | 8/2012 | ............ H04L 12/10 |

OTHER PUBLICATIONS

International Search Report and Written Opinion, Application No. PCT/EP2019/085029, 12 pages, dated Mar. 31, 2020.

* cited by examiner

METHOD FOR DEACTIVATING A MOTOR VEHICLE, DEACTIVATION SYSTEM FOR A MOTOR VEHICLE, AND MOTOR VEHICLE

CROSS-REFERENCE TO RELATED APPLICATIONS

This application claims priority to German Patent Application No. DE 10 2018 222 864.7, filed on Dec. 21, 2018 with the German Patent and Trademark Office. The contents of the aforesaid Patent Application are incorporated herein for all purposes.

TECHNICAL FIELD

The invention relates to a method for deactivating a motor vehicle, to a deactivation system for a motor vehicle, and to a motor vehicle.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

In addition to mechanical components, motor vehicles typically comprise electronic components that may be embedded computers or components of computers, for example Bluetooth interfaces, USB interfaces, bus systems, or over-the-air interfaces such as WLAN, UMTS, GSM, LTE, 5G and the like.

Electronic components of this kind may communicate with external units. For example, it is possible for an on-board computer of a motor vehicle to communicate with a mobile telephone (e.g. wirelessly via Bluetooth or a wireless network) located in the vehicle interior, but it may also communicate with the Internet via a mobile communications network without involvement of the mobile telephone.

It is also generally known to equip motor vehicles with an immobilizer and the like in order, for example, to prevent theft of the motor vehicle. There is also the possibility to remotely deactivate motor vehicles via a software function.

A disadvantage of these systems is that they do not provide a solution for reliably deactivating a motor vehicle.

SUMMARY

An object exists to provide an improved method for deactivating a motor vehicle, a deactivation system for a motor vehicle, and a motor vehicle.

The object is solved by a method for deactivating a motor vehicle, a deactivation system for a motor vehicle, and the motor vehicle according to the independent claims.

Embodiments are apparent from the dependent claims, the following description, and the drawings.

DESCRIPTION

Figure 1:
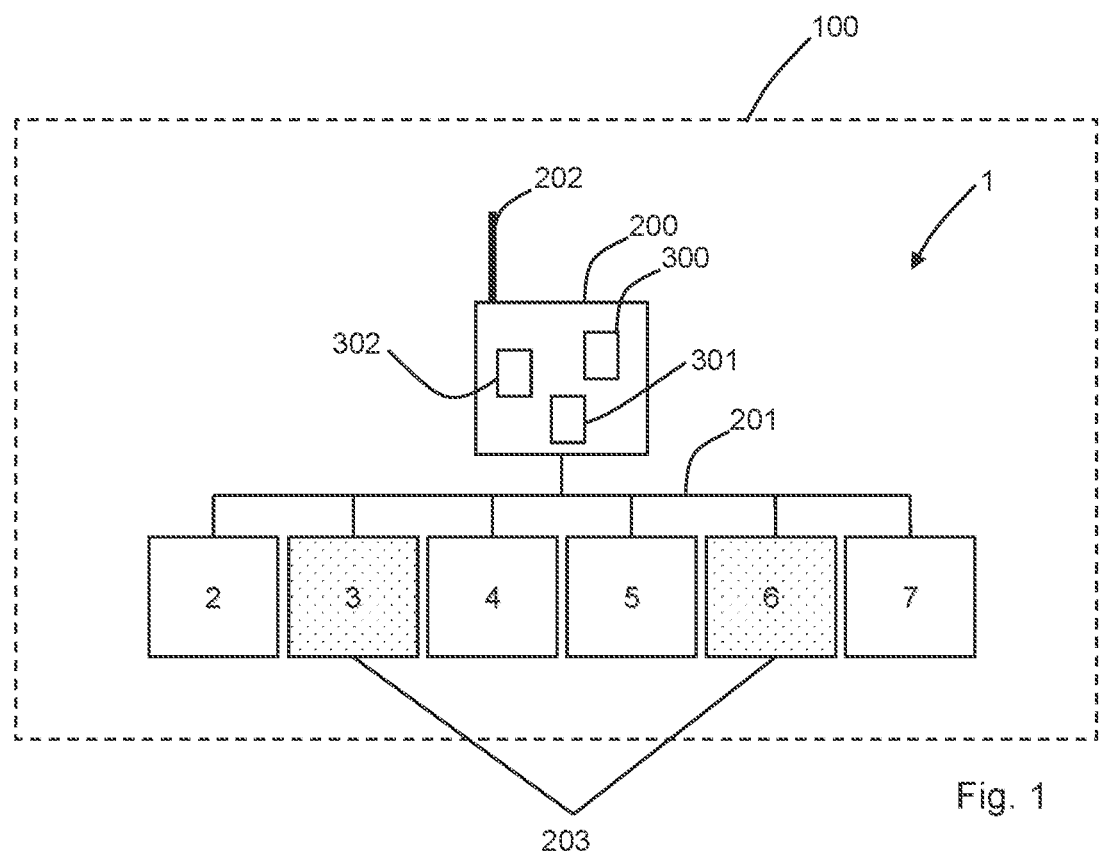
FIG. 1 schematically shows an exemplary embodiment for a group of control units.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

Some exemplary embodiments relate to a method for deactivating a motor vehicle, wherein the motor vehicle comprises a deactivation system having a plurality of bus subscribers each having a deactivation function. The method for deactivating a motor vehicle of the present embodiment comprises:

selecting, on the basis of a random number, a set of bus subscribers from a plurality of bus subscribers having the deactivation function in order to provide the deactivation of the motor vehicle.

A motor vehicle may be any desired vehicle that is powered by an engine (e.g. internal combustion engine, electric motor, etc.), for example an automobile, a motorcycle, a truck, a bus, agricultural or forestry tractors, or the like.

The motor vehicle may be deactivated in a variety of ways. For example, an ignition may be switched off, a gas pedal or brake may be blocked, a fuel supply may be interrupted, an engine control unit may be deactivated, a power supply to the starter may be interrupted, or the like.

The bus subscribers may in principle be present in any desired, known bus system, such as the CAN bus (Controller Area Network). Additionally, other bus systems that are also applied in the automotive industry may also be used, for example LIN (Local Interconnect Network), FlexRay, MOST (Media Oriented Systems Transport), PSI5 (Peripheral Sensor Interface 5), the Ethernet—as known from the computer sector—and the like.

In this connection, a bus subscriber may be a control unit in some embodiments, wherein the control unit is typically configured for a predefined control function, such as for a window lift, a central locking system, an engine control unit, an ABS (anti-lock braking system) control unit, a transmission control unit, an ESP (electronic stability program) control unit, an airbag control unit, an air-conditioning control unit, or the like. A bus subscriber may also be a central on-board computer (of the motor vehicle), a component of the central on-board computer or any motor vehicle component that is capable, for example, of generating electrical signals.

The deactivation function may be any function that is used to deactivate the motor vehicle or that is intended to effectuate the deactivation. In some exemplary embodiments, the deactivation function may cause direct deactivation, for example by sending out a command that deactivates a component required for driving operation. For example, a bus subscriber may be connected to a component that is essential to driving operation and may send a command that renders said component inoperative. For example, a bus subscriber may have access to an engine control unit, a starter, a power supply for the engine or the like and switch them off.

However, the deactivation function may also indirectly deactivate the motor vehicle, for example by sending a message or deactivation command to another entity, such as a central control system, which then deactivates the motor vehicle in response to receiving the message or deactivation command.

The deactivation function may also be executed by multiple bus subscribers. For example, the set of bus subscribers may have access to an engine control unit, a starter, a power supply for the engine or the like and switch them off. This has the benefit that a great deal of effort is required for reversing the deactivation, since all bus subscribers involved in the deactivation would have to be replaced or reprogrammed.

The bus subscribers may be directly connected to the components to be deactivated or, as already mentioned, to a central control system, for example a central control unit or the central on-board computer of the motor vehicle, which then carries out the deactivation of the motor vehicle.

In some exemplary embodiments, a set of bus subscribers includes a subset of bus subscribers having the deactivation function (in others only one or all bus subscribers). The subset may be determined in any desired manner, for example by compiling a list of various combinations of bus subscribers. Each of the various combinations may then be assigned a number that corresponds to the position in the list.

However, a number may also be assigned directly to each bus subscriber, the numbers in this case being selected randomly.

It is possible for the subset to always have the same number of elements. In a case with n bus subscribers and k elements, the number of elements N is $$N = \binom{n}{k} = \frac{n!}{k!(n-k)!}, \text{ wherein } n! = n*(n-1)*(n-2)* \ldots *3*2*1.$$

For the case where the subset is to cover a range of elements, i.e. the subset may have 1 to k elements, wherein k>1>0, the number of elements N is $$N = \binom{n}{k} + \binom{n}{k-1} + \ldots + \binom{n}{l+1} + \binom{n}{l}.$$

The numbers assigned to the elements in the list come from the number range 1 to N.

An element that corresponds to a (predetermined) set of selected bus subscribers may be selected from the list using a random number in the range of 1 to N.

Any other combinational counting method for assigning numbers to elements is also possible, for example counting methods in which the order of the elements is important.

A random number may in principle be any number that is generated by means of a deterministic (e.g. pseudo-random) or non-deterministic random number generator.

Deterministic random number generators include, for example, Mersenne Twister, (recursive) arithmetic random number generators, inverse congruence generators, xorshift generators, multiply-with-carry generators, or the like.

Non-deterministic random number generators include, for example, physical random number generators, which are based on physically random events when the random number is obtained. Processes of this kind include, for example, atmospheric noise, CCD sensor noise, voltage fluctuations of a Zener diode, processes based on quantum measurements, or the like.

The deactivation function may be provided in various ways. In some exemplary embodiments, the set of bus subscribers may be put in a state in which the deactivation function may be performed. In others, the set of bus subscribers may be put in a state in which the deactivation function is performed.

The above-described method produces the benefit that it is difficult to reactivate a motor vehicle that has been deactivated, since all bus subscribers would have to be replaced or reprogrammed, which would involve considerable effort. The random selection of bus subscribers has the effect that it is not possible to tell which bus subscribers need to be replaced or reprogrammed. The probability that the random replacement or reprogramming of bus subscribers leads to the motor vehicle being activated is 1/N, wherein N is the total number of bus subscribers (in some exemplary embodiments, the total number of bus subscribers is greater than 30, e.g. 50 or even more, without the present invention being restricted to a specific total number). Moreover, the above-described method offers the benefit that, instead of a large amount of data being transmitted, as is the case for a large quantity of control units, the data required for the deactivation only have to be sent to the set of bus subscribers, and therefore the amount of data required is lower, it also remaining improbable that the deactivation function will be disabled with the exchange of a few control units.

In some exemplary embodiments, each bus subscriber of the set of bus subscribers sends a deactivation command to a central control system of the motor vehicle.

A deactivation command may be a command for disabling a function that is essential to operation of the motor vehicle, for example switching off the power supply of an engine, deactivating the engine control unit or the like, as already explained above.

A deactivation function may also include a time at which the motor vehicle is deactivated, whereas in other exemplary embodiments, the deactivation time is set, for example, by means of the central control system (which for example prevents the motor vehicle from being deactivated when the motor vehicle is being moved or is in a state in which deactivation could pose a danger to motor vehicle occupants). As such, in some exemplary embodiments, deactivation is only carried out when the central control system detects a specific state of the motor vehicle (e.g. switched off and safely parked, etc.).

The central control system may for example be a central control unit, an on-board computer, or the like.

This has the benefit that the motor vehicle is deactivated by all bus subscribers of the set of bus subscribers, which results in the replacement or reprogramming of an individual bus subscriber of the set of bus subscribers not resulting in activation of the motor vehicle.

In some exemplary embodiments, the motor vehicle is deactivated by means of the central control system of the motor vehicle in response to receiving at least one deactivation command, wherein, as already mentioned, the central control system may make the deactivation time dependent, for example, on the state of the motor vehicle, on a predetermined time, or the like.

The deactivation command may be received in various ways, for example wirelessly (e.g. via an air interface) or by wire. For example, the air interface, which is for example provided in the central control system, may receive (and if applicable send) via Bluetooth, Wi-Fi, WLAN, infrared, or the like, or via one of the above-mentioned bus systems (e.g., if wires are used).

Beneficially, as a result, (immediate) deactivation of the motor vehicle may be initiated, e.g., from a distance. It is also possible to generate a time at which the motor vehicle is to be deactivated or the deactivation depends on one or more parameters, such as a speed parameter (very low or zero), the parking brake being activated, ignition off, engine off, etc.

In some exemplary embodiments, a deactivation request is received and, in response to the receipt of the deactivation request, the deactivation function of the bus subscribers of the set of bus subscribers is set up.

As already explained, the deactivation request may be received via a wireless interface such as Bluetooth, Wi-Fi, WLAN, infrared, or the like. In some exemplary embodiments, as explained above, the wireless interface may also be an air interface, for example RFID, FOTA, mobile communications, GSM, UMTS, WiMax, WLAN, LTE, Bluetooth, radio broadcasting, IrDA, or the like.

Furthermore, the deactivation function may be received via one of the above-mentioned bus systems or by other bus systems that are not linked to motor vehicle electronics, for example USB (Universal Serial Bus).

The deactivation function may be set up in such a way that the motor vehicle is deactivated as already described above. As such, setup includes, for example, activation of the bus subscribers of the set of bus subscribers such that they send the deactivation command or are at least ready to send the deactivation command one or more times in response to a trigger (e.g., a start command from the central control system).

This has the benefit that the set of bus subscribers may be changed or may be selectively chosen. It is also possible, for example, for all bus subscribers to be successfully replaced or reprogrammed such that the motor vehicle may be reactivated. When, at the next deactivation, another set of bus subscribers is set up, this set of bus subscribers must be replaced, again with the probability of success being 1/N.

In some exemplary embodiments, the setup of the deactivation function of the bus subscribers includes a software update procedure. The software, which is stored on the bus subscribers of the set of bus subscribers, may in this case be overwritten, wherein said overwriting may be done completely or partially, including overwriting of only one bit to activate the deactivation function. This may result in a deactivation command being sent.

This has the benefit that motor vehicle deactivation may be initiated in cases where the motor vehicle software may only be changed by a central body. Accordingly, in some exemplary embodiments, the bus subscribers are configured such that they may be involved in a software update procedure and may alter their basic or operating software. The bus subscribers may also be configured to "download" the software updates themselves, i.e., from a central control system via a motor vehicle bus or even from an external source via the air interface.

Another benefit is that deactivation may be initiated or overridden with only one authorization, as a result of which driving safety risks may be minimized.

In some exemplary embodiments, there is a deactivation system for a motor vehicle comprising a plurality of bus subscribers each having a deactivation function and comprising a central control system, wherein the deactivation system is configured to carry out a method according to any one of the above-mentioned exemplary embodiments.

In some exemplary embodiments, there is a deactivation system in which the bus subscribers are control units, which has the benefit that no sizing of new units is required, since control units are usually present in motor vehicles. Accordingly, in some exemplary embodiments, the method is applied to available motor vehicles having bus subscribers and may, for example, be implemented within the scope of a software update.

In some exemplary embodiments, the bus subscribers have an encrypted memory area in which the deactivation function is stored.

The encrypted memory area may include any desired data memory, for example an ROM (read-only memory), RAM (random-access memory), solid state drive (SSD), flash memory, or the like.

The encryption may take place in any desired manner, for example using symmetric encryption methods such as AES (Advanced Encryption Standard), DES (Data Encryption Standard), IDEA (International Data Encryption Algorithm), Blowfish, QUISCI (Quick Stream Cipher), Twofish, or the like.

The encryption may also use asymmetric encryption methods, such as RSA, Merkle-Hellmann, McEliece, Rabin, Chor-Rivest, Elgamal, (post-)quantum cryptographic methods or the like.

A hybrid encryption method that constitutes a mix of symmetric and asymmetric encryption methods is also possible.

As a result, it may be provided that only an authorized person in possession of the key may have an influence on the deactivation function.

In some exemplary embodiments, the set of bus subscribers is stored in the secure memory area of a central control system.

In some exemplary embodiments, the set of bus subscribers is stored in the secure memory area of multiple bus subscribers.

In order to further increase the security of the method, in some exemplary embodiments, the information about the set of bus subscribers is transmitted to a central system via a radio interface. A central system may be a server, a provider or the like.

In some exemplary embodiments, the deactivation of the motor vehicle may be canceled, i.e., the motor vehicle may be reactivated, wherein a similar method to the one described above is used for this.

Moreover, in some exemplary embodiments, global activation may take place based on a calculated key that is sent globally (e.g., by means of central broadcasting), as a result of which all control units present in the motor vehicle may be put in a state in which a deactivation (function) is not active.

Conversely, the vehicle may also be activated such that, for example, only the selected set of bus subscribers is put in a state in which the deactivation function is no longer active.

Some exemplary embodiments relate to a motor vehicle (as described herein) that comprises a deactivation system of the like described herein.

Further exemplary embodiments are described below by way of example and with reference to the appended drawings.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

FIG. 1 schematically shows an exemplary embodiment for a group 1 of control units 2, 3, 4, 5, 6, 7 that is part of a motor vehicle 100, which is in this case designed as a car with a gasoline engine, without the present invention being restricted in this regard.

The group 1 of control units 2-7 contains the control units 2 to 7, which have a deactivation function DDF (drive disabling function).

Therefore, in the following, "group of control units" is shortened to "DDF group 1". The control units 2 to 7 are connected to a central control unit 200 via a vehicle bus system 201, for example FlexRay or CAN.

The central control unit 200 further comprises a processor 301, a memory 302, an interface 303 and an antenna 202.

When activated, the DDF serves to deactivate the motor vehicle 100 in the manner explained above.

The DDF group 1 with the control units 2 to 7 are interconnected via a vehicle bus system 201. For the sake of simplicity, only six control units are shown in FIG. 1 by way of example, whereas fifty control units, for example, are provided in the motor vehicle 100 (in principle, the number of control units in the motor vehicle is freely selectable).

In this exemplary embodiment, the control units 2 to 7 are in principle configured to send a deactivation command to the central control unit 200, whereupon the central control unit 200 deactivates the motor vehicle 100.

In this exemplary embodiment, two control units 3 and 6 are selected in order to select a set 203 of bus subscribers. Depending on the exemplary embodiment, only one control unit or more than two control units may be selected in order to form the set 203 of bus subscribers as described above.

In this exemplary embodiment, this therefore produces fifteen possibilities as to which of the control units 2 to 7 are selected. In the following, the possibilities are represented as tuples, wherein each element of the tuple corresponds to a control unit of the control units 2 to 7.

The possibilities are: (2,3), (2,4), (2 5), (2,6), (2,7), (3,4), (3,5), (3,6), (3,7), (4,5), (4,6), (4,7), (5,6), (5,7), (6,7). In this exemplary embodiment, the order of the selection is irrelevant, i.e. the tuple (2,3) corresponds to the tuple (3,2), for example, and as such permutations of the tuples are not shown in the table below.

Each of the tuples is assigned an identification number by means of which the tuple may be identified, as shown in the following table:

| Identification number | Tuple |
| --- | --- |
| 1 | (2, 3) |
| 2 | (2, 4) |
| 3 | (2, 5) |
| 4 | (2, 6) |
| 5 | (2, 7) |
| 6 | (3, 4) |
| 7 | (3, 5) |
| 8 | (3, 6) |
| 9 | (3, 7) |
| 10 | (4, 5) |
| 11 | (4, 6) |
| 12 | (4, 7) |
| 13 | (5, 6) |
| 14 | (5, 7) |
| 15 | (6, 7) |

This table may be stored, for example, in the memory 302 of the control system 200.

A random number generator generates a random number between 1 and 15, as a result of which the set 203 of control units is selected as the tuple of the control units 3 and 6. The set 203 of control units provides the deactivation function.

In order to activate the deactivation function in the control units 3 and 6 of the set 203 of control units, a command may for example be transmitted to said control units by the central control unit 200 as described in detail below.

Figure 2:
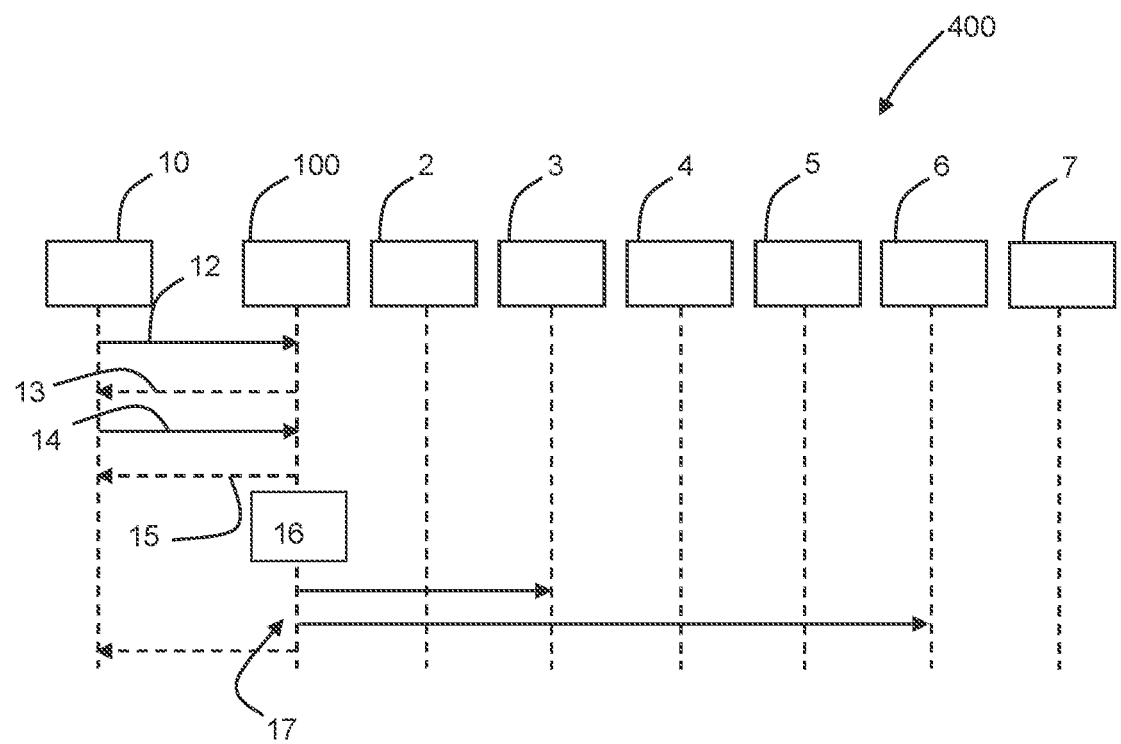
FIG. 2 is a diagram showing an exemplary embodiment of a method for deactivating a motor vehicle.

FIG. 2 is a diagram of an exemplary embodiment of a method 400 for deactivating the motor vehicle 100, wherein the method 400 is substantially carried out by the central control unit 200 with its control units 2-7.

An operator (e.g. an insurance company, a leasing company, a police department or the like) or a piece of software 10 requests a software update at 12 from the motor vehicle 100 over-the-air in DDF mode, in that a corresponding deactivation request is transmitted via a mobile communications system to the motor vehicle 100, wherein the control unit 200 receives said request via its air interface 202. The motor vehicle 100 (or the central control unit 200) confirms the DDF mode at 13 by transmitting a corresponding message via the mobile communications network to the operator or piece of software 10.

Subsequently, a software update is initiated at 14 and at 15 the DDF status is transmitted from the central control unit 200 of the motor vehicle 100 to the operator or piece of software 10, in that a corresponding message is transmitted via the mobile communications network notifying that it is fundamentally possible to proceed with deactivation.

The central control unit 200 then, at 16, randomly selects the bus subscribers of the DDF group 1 from the control units 2 to 7 as already explained, which produces the set 203 consisting of control unit 3 and 6, which are to provide the deactivation function together.

The central control unit 200 generates a key for activating the DDF and transmits said key to the control units 3 and 6 of the set 203 of control units.

In response to the keys transmitted to the set 203 of control units within the scope of the software update, the DDF is activated in the control units 3 and 6 at 17, such that the control units 3 and 6 of the set 203 of control units transmit a deactivation command via the vehicle bus system 201 to the central control unit 200, which takes corresponding measures in response thereto in order to deactivate the motor vehicle 100.

Figure 3:
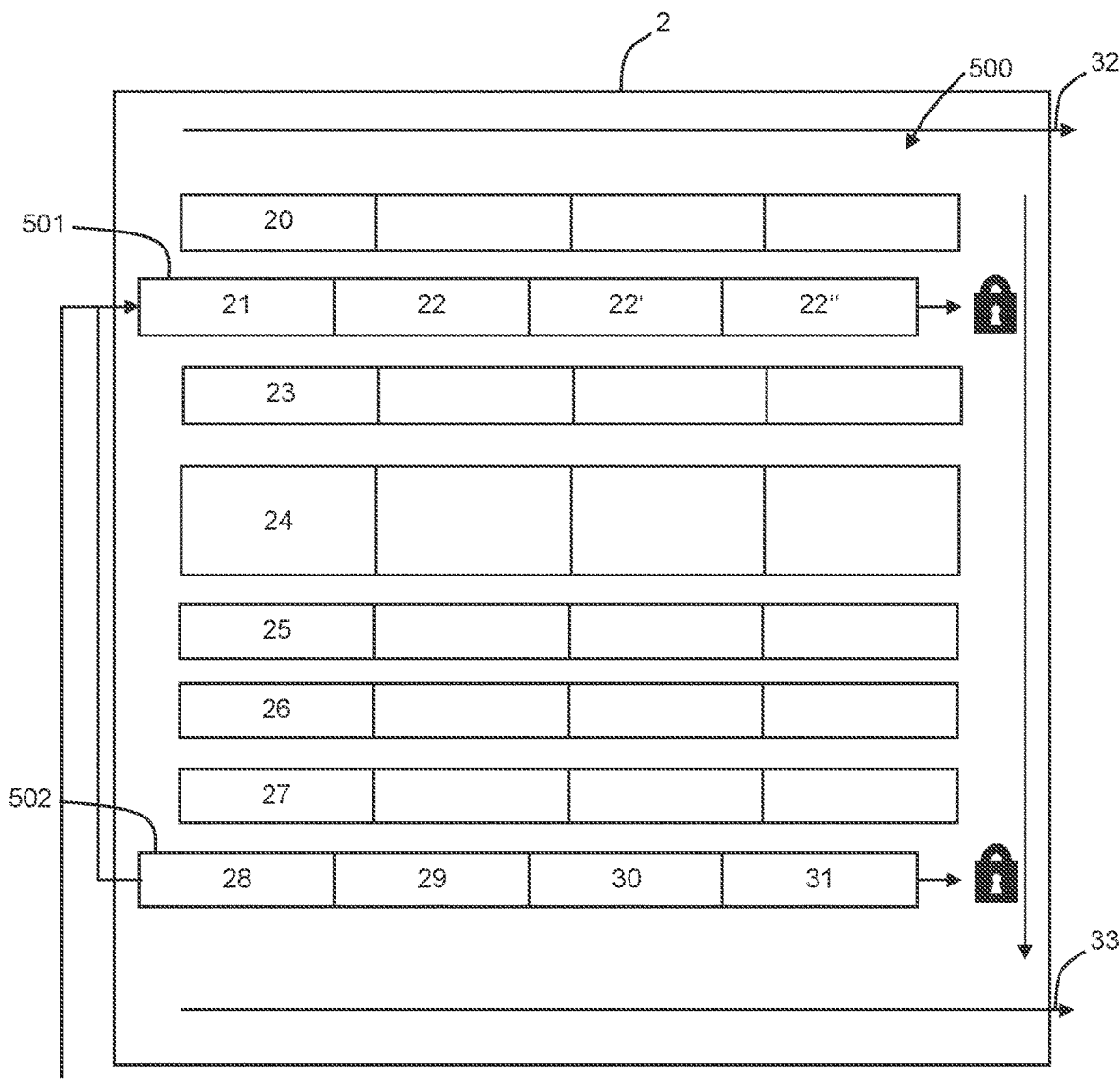
FIG. 3 is a block diagram of an exemplary embodiment of a bus subscriber designed as a control unit.

In the following, the structure of a memory area 500 of the control unit 2 of the control units 2 to 7 will be explained by way of example with reference to FIG. 3.

The memory area 500 of the control unit 2 has an unencrypted memory area and an encrypted memory area 501 or 502.

The unencrypted memory area has a bootloader 20, operating software 23 and two applications 24 and 27.

The encrypted memory area is subdivided into a first encrypted memory area 501 and a second encrypted memory area 502.

The first encrypted memory area 501 comprises the elements DDF 21 and other elements 22, 22', 22", the memory content of which is encrypted.

The second encrypted memory area 502 comprises a memory element 28, which provides redundancy to the first encrypted memory area 501, a mirror area 29 for mirroring data of the first memory area 501, a complement area 30 and another memory element 31, which is encrypted.

Furthermore, the control unit 2 may communicate with other units via the interfaces 32 and 33.

The first encrypted memory area 501 may be overwritten externally, for example by the central control unit 200, if the DDF is to be activated. Moreover, the first encrypted memory area 501 is overwritten with data from the second encrypted memory area 502, for example if it is determined that the first memory area 501 is faulty or if the DDF is to be deactivated.

LIST OF REFERENCE NUMERALS

1 Deactivation system
2-7 Bus subscribers
10 Operator or software
12 Deactivation command
13 Confirmation of Drive Disabling Function mode
14 Performance of software update
15 Transmission of Drive Disabling Function status
16 Random determination of the DDF subscribers and generation of the key
17 Activation of the Drive Disabling Function
20 Bootloader
21 Drive Disabling Function
22-22" Other encrypted memory area
23 Operating software
24, 27 Application
25 Calibration
26 Data set
28 Redundancy
29 Mirror area
+Complement area
31 Other encrypted memory area
32, 33 Interfaces of a control unit
100 Motor vehicle
200 Central control unit
201 Vehicle bus system
202 Antenna
203 Set of bus subscribers
301 Processor
302 Memory
303 Interface of the central control unit
400 Method for deactivating a motor vehicle
500 Memory area of a control unit
501 First encrypted memory area of a control unit
502 Second encrypted memory area of a control unit The invention has been described in the preceding using various exemplary embodiments. Other variations to the disclosed embodiments maybe understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for deactivating a motor vehicle, wherein the motor vehicle comprises a deactivation system having a plurality of bus subscribers each having a deactivation function, said method comprising:
   selecting, on the basis of a random number, a set of bus subscribers from a plurality of bus subscribers having the deactivation function in order to provide the deactivation of the motor vehicle;
   sending a deactivation command from each bus subscriber of the set of bus subscribers to a central control system of the motor vehicle; and
   deactivating the motor vehicle in response to the receipt of at least one deactivation command from at least one of the bus subscribers from the set of bus subscribers by the central control system of the motor vehicle.

2. The method of claim 1, further comprising: receiving a deactivation request and, in response to the receipt of the deactivation request setting up the deactivation function of the bus subscribers of the set of bus subscribers.

3. The method of claim 2, wherein the deactivation request is received via an air interface of the motor vehicle.

4. The method of claim 2, wherein the setup of the deactivation function of the bus subscribers includes a software update procedure.

5. A deactivation system for a motor vehicle comprising a plurality of bus subscribers each having a deactivation function and comprising a central control system, wherein the deactivation system is configured to carry out the following steps:
   selecting, on the basis of a random number, a set of bus subscribers from a plurality of bus subscribers having the deactivation function in order to provide the deactivation of the motor vehicle;
   sending a deactivation command from each bus subscriber of the set of bus subscribers to a central control system of the motor vehicle; and
   deactivating the motor vehicle in response to the receipt of at least one deactivation command from at least one of the bus subscribers from the set of bus subscribers by the central control system of the motor vehicle.

6. The deactivation system of claim 5, wherein the bus subscribers are each configured as processor units.

7. The deactivation system of claim 5, wherein the bus subscribers have an encrypted memory area in which the deactivation function is stored.

8. A motor vehicle comprising the deactivation system of claim 5.

9. The method of claim 3, wherein the setup of the deactivation function of the bus subscribers includes a software update procedure.

10. The deactivation system of claim 5, wherein the deactivation system is further configured for receiving a deactivation request and, in response to the receipt of the deactivation request, setting up the deactivation function of the bus subscribers of the set of bus subscribers.

11. The deactivation system of claim 10, wherein the deactivation request is received via an air interface of the motor vehicle.

12. The deactivation system of claim 10, wherein the setup of the deactivation function of the bus subscribers includes a software update procedure.

13. The deactivation system of claim 11, wherein the setup of the deactivation function of the bus subscribers includes a software update procedure.

14. A motor vehicle comprising the deactivation system of claim 6.

15. A motor vehicle comprising the deactivation system of claim 7.

\* \* \* \* \*